(12) United States Patent
Dobson et al.

(10) Patent No.: US 7,073,604 B1
(45) Date of Patent: Jul. 11, 2006

(54) HYDRAULIC HOLDING CYLINDER FOR WING LIFT MECHANISM

(75) Inventors: David Dobson, York (CA); Dale S. Ryczak, Theodore (CA)

(73) Assignee: Morris Industries Ltd., Saskatchewan (CA)

( * ) Notice: Subject to any disclaimer, the term of this patent is extended or adjusted under 35 U.S.C. 154(b) by 0 days.

(21) Appl. No.: 11/063,112

(22) Filed: Feb. 22, 2005

(51) Int. Cl.
*A01B 49/00* (2006.01)

(52) U.S. Cl. .................. 172/311; 172/663; 172/456; 172/458; 111/57

(58) Field of Classification Search .............. 172/311, 172/456, 458, 663; 111/57
See application file for complete search history.

(56) References Cited

U.S. PATENT DOCUMENTS

| | | | | |
|---|---|---|---|---|
| 4,612,997 A | * | 9/1986 | Wilkins | 172/776 |
| 4,615,397 A | * | 10/1986 | Hastings | 172/776 |
| 6,092,609 A | * | 7/2000 | Jeffery et al. | 172/311 |
| 6,125,775 A | * | 10/2000 | Gust | 111/52 |
| 6,263,977 B1 | * | 7/2001 | Mayerle et al. | 172/311 |
| 6,561,283 B1 | * | 5/2003 | Hundeby | 172/459 |
| 6,761,228 B1 | | 7/2004 | Dobson et al. | |

* cited by examiner

*Primary Examiner*—Daniel P. Stodola
*Assistant Examiner*—Julianne Cozad
(74) *Attorney, Agent, or Firm*—Hovey Williams LLP (57) ABSTRACT

The transversely extending frame of a machine has a number of hingedly interconnected frame sections that may be raised and lowered by lift cylinders to convert the machine between a wide-spread working position and a folded-up transport position. Two lift cylinders for raising and lowering inner wing frame sections relative to the central main frame section are anchored at their inner ends to a hydraulically operated holding cylinder that effectively adjusts the positions of the anchor points of the lift cylinder in a lateral sense. Thus, when the holding cylinder is fully contracted, the inner wing frame sections may be lowered by their lift cylinders until the lift cylinders are fully extended, but the outer ends of the inner wing frame sections remain tilted upwardly to a certain extent. Thus, outer wing frame sections connected to the outer ends of the inner wing frame sections also remain slightly lifted off the ground until fully unfolded from the inner wing frame sections. Thereupon, the holding cylinder may be extended to gently lower all wing frame sections to the ground without damaging tools or mounting components for such tools.

4 Claims, 6 Drawing Sheets

HYDRAULIC HOLDING CYLINDER FOR WING LIFT MECHANISM

TECHNICAL FIELD

The present invention relates to farm machinery and, more particularly, to machinery that utilizes a multiplicity of frame sections that are hingedly connected to one another for flexing in the field and for permitting fold up for transport, such as typically found in tillage equipment.

BACKGROUND AND SUMMARY

It is well known in the art to provide wing frame sections on farm machinery such as tillage and planting equipment wherein one or more wing frame sections can be folded up relative to a central main frame section to reduce the overall width of the machine for transport. In some five-section machines, for example, hydraulic cylinders fold outer wing sections almost 180° on top of inner wing frame sections and then other lift cylinders raise the inner wing frame sections into essentially upright positions to provide a compact piece of machinery for over-the-road travel or movement through gates and the like. It is also well known to provide lost motion couplings between the various lift cylinders and their wing frame sections so that, in the field-working position, the frame sections can be hinged relative to one another as need be to accommodate changes in ground contour encountered by the different sections of the machine. While this type of "flexing" action is important during field operations, it can also create problems during unfolding operations, particularly for the outer wing sections.

In this regard, the unfolding sequence of a five-section machine, for example, is that the inner wing frame sections are the first to unfold, followed then by the outer wing frame sections. As the inner wing frame sections are lowered down to their working positions and their tools come into ground engagement, their lift cylinders continue to extend an additional amount so as to position the lost motion coupling in an intermediate position, so that the inner wing sections can flex up and down to a certain extent relative to the main section. After the inner lift cylinders are thus fully extended, the outer lift cylinders unfold the outer wing frame sections and place them in the field working position as well. However, if the outer ends of the inner wing frame sections have dipped down slightly because their tools have sunk into soft ground or the ground is inclined, the tools on the outer wing frame sections near the hinge points may dig into the ground and bear an excessive amount of the load as the outer wing frame sections pivot down into their working positions. This is a particular problem where tools such as packer wheels project back from the rear of the outer wing frame sections and are supported by linkage that allows the packer wheels to drop down below the transport wheels on the outer wing frame sections. The gangs of packer wheels may tend to flip up and/or stress the mounting frames and pivot areas of the gangs.

The present invention provides a way of holding an inner wing frame section slightly raised while the outer wing frame section is lowered into its transport position, thereby keeping packer wheel gangs or other tools on the outer wing frame section from digging or dragging into the ground as the outer wing frame section approaches its unfolded condition. In a preferred embodiment, the inner end of the inner wing lift cylinder is not fixedly mounted to the main frame section as in conventional arrangements but is instead connected to a holding cylinder that adjusts the anchor point of the inner lift cylinder. Thus, when the holding cylinder is contracted, the anchor point of the inner wing lift cylinder is positioned more inboard that usual, preventing the inner wing frame section from swinging down to a completely horizontal position when the inner lift cylinder is fully extended during unfolding. Therefore, the hinge point for the outer wing section is held in a sufficiently elevated position that the tools of the outer wing section near the hinge point are not allowed to significantly contact the ground as the outer wing frame section unfolds. Once the outer lift cylinder has fully extended, the holding cylinder extends to allow both the inner and outer wing sections to settle down to the ground and place their lost motion couplings in intermediate positions to permit the desired flexing or floating action of the wings relative to the main frame section.

In a preferred embodiment, the holding cylinder is connected between the anchor ends of the two inner lift cylinders of a five-section machine so that the holding cylinder helps both sides of the machine. Preferably, in addition to being interconnected by the holding cylinder, the anchor ends of the inner lift cylinders are also attached to the main frame section by swingable lever assemblies. Desirably, the holding cylinder is on a separate hydraulic circuit from the wing lift cylinders, or at least a circuit that can be isolated from other circuitry associated with the wing lift cylinders by sequence valves or the like so that the holding cylinder is always the first to contract during the folding sequence and the last to extend during the unfolding sequence.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Machine 10 shown throughout the figures may take a variety of different forms. In the illustrated embodiment, the machine is provided with rows of openers 12 (with points removed) that are attached to the frame of the machine for making furrows in the soil as the machine passes over the ground. Gangs of packer wheels 14 are attached to the rear of the frame of the machine and are useful in closing furrows created by openers 12 after seeds or other substances have been deposited in such furrows utilizing delivery means not illustrated. The principles of the present invention are not limited to any particular type of winged machine, and have utility in connection with various types of planters, seeders, fertilizer depositing machines, and straight tillage machines.

Figure 6:
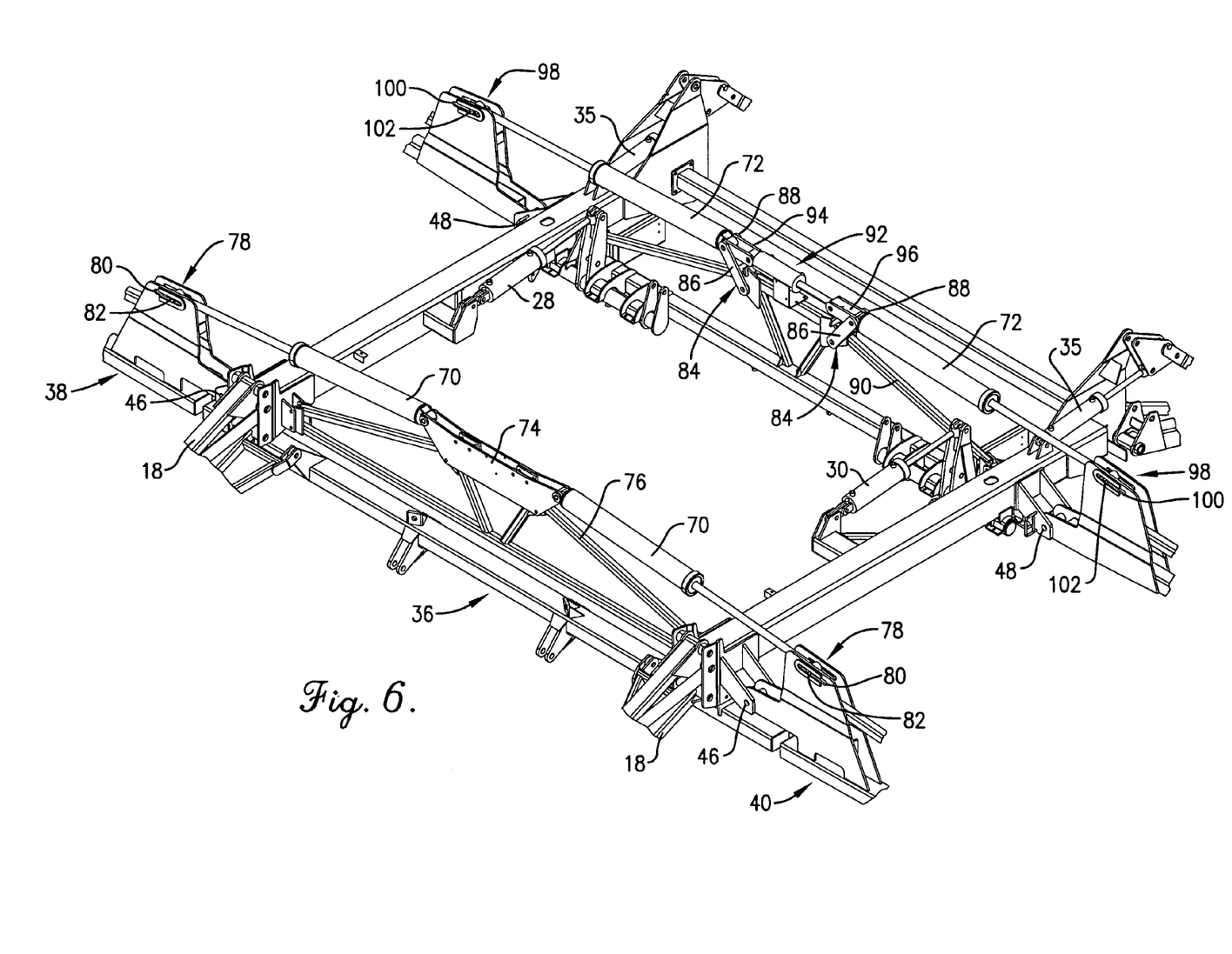
FIG. 6 is a fragmentary, top left front isometric view of the machine with parts removed for clarity, the holding cylinder being illustrated in its fully extended condition.

Machine 10 is provided with a relatively long, transversely extending frame 16 that is supported along the front by a number of ground-engaging wheel assemblies 18. The packer wheels 14 support the rear of the frame 16 during field operations, and a pair of rear transport wheel assemblies 19 support frame 16 during transport. During field operations, transport wheel assemblies 19 are disposed in raised, standby positions (not shown). Wheel assemblies 18 and packer wheels 14 can be vertically shifted relative to frame 16 so as to raise and lower the latter for depth control purposes during field operations. A tongue 20 extending forwardly from frame 16 has a hitch coupling 22 at its forwardmost end for connecting machine 10 with a towing vehicle (not shown). Wheel assemblies 18 and packer wheels 14 are raised and lowered relative to frame 16 by a number of hydraulic cylinders, including cylinders 24, 26, 28, 30, 32 and 34 shown in FIG. 1. Cylinders 35 (FIGS. 6 and 7) raise and lower rear transport wheel assemblies 19.

In the illustrated embodiment, frame 16 is divided into five frame sections, namely a center or main frame section 36, a pair of inner wing frame sections 38 and 40 hingedly connected to opposite outer ends of main frame section 36, and a pair of outer wing frame sections 42 and 44 hingedly connected to the outer ends of inner wing frame sections 38 and 40 respectively. Inner wing frame sections 38, 40 are secured to main frame section 36 by fore-and-aft aligned pivots 46, 48, while outer wing frame sections 42, 44 are secured to inner wing frame sections by fore-and-aft aligned pivots 50, 52.

Figure 5:
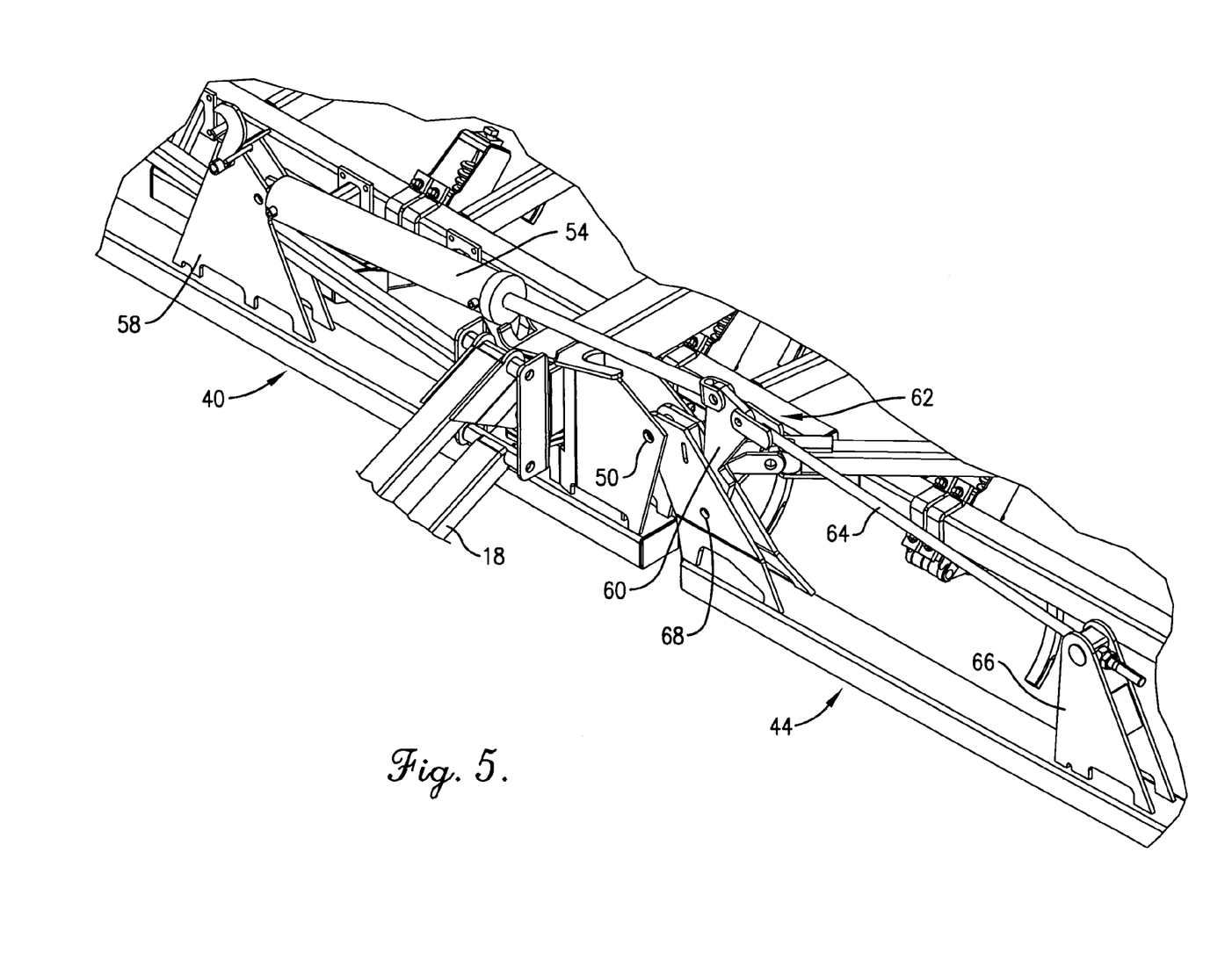
FIG. 5 is an enlarged, fragmentary top left isometric view of the machine illustrating one of the outer lift cylinders and its lost motion coupling with its outer wing frame section.

Raising and lowering of outer wing frame sections 42, 44 relative to inner wing frame sections 38, 40 is carried out by a pair of outer lift cylinders 54 and 56 on each inner wing frame section 38, 40. As illustrated in FIG. 5, for example, each outer lift cylinder 54, 56 is connected at its inner end to an upstanding member 58 on the inner wing frame section 38 or 40 and is connected at its outer end to a swingable, upright lever 60 that forms part of a lost motion coupling 62 with outer wing frame section 42 or 44. A rigid link 64 is connected between lever 60 on the one hand and an upstanding lug 66 adjacent the outer end of outer wing frame section 42 or 44 on the other hand. Lever 60 is swingable about a fore-and-aft pivot 68 (FIG. 5) between a pair of opposed stops (not shown) associated with the hinge mechanism of outer wing frame section 42 or 44. Thus, during actuation of lift cylinders 54 and 56, lost motion occurs as cylinder 54 or 56 moves lever 60 to one or the other of its opposite extremes to make engagement with the corresponding stop. Thereafter, the outer wing frame section 42 or 44 is raised or lowered as the case may be. Such lost motion coupling 62 permits flexing or flotation of outer wing frame sections 42, 44 relative to inner wing frame sections 38, 40.

Each inner wing frame section 38, 40 is raised and lowered by a pair of inner lift cylinders 70 and 72. The front pair of inner lift cylinders 70 are connected at their anchor ends to main frame section 36 by a rigid bracket 74 that is in turn rigidly affixed to frame 36 by an upstanding truss 76. At its rod end, each front lift cylinder 70 has a lost motion coupling 78 with its inner wing frame section 38 or 40 so as to allow flexing of such inner wing section relative to main frame section 36. In a preferred embodiment, each lost motion coupling 78 takes the form of a pair of fore-and-aft aligned, generally horizontal slots 80 in hinge mechanism associated with the inner wing frame section 38 or 40 and a fore-and-aft extending pin 82 in slots 80 that is associated with the rod end of cylinder 70. Each cylinder 70 thus does not begin to apply a lifting force against its inner wing frame section until pin 82 is against the inner end of slots 80; likewise, it does not apply a pushing force against its inner wing frame section until pin 82 is against the outer end of slots 80.

The anchor ends of the rear pair of inner lift cylinders 72 are adjustably, swingably coupled with main frame section 36 by a pair of lever assemblies 84, each of which comprises a pair of generally upright levers 86 and 88 on opposite fore-and-aft sides of the anchor end of the corresponding cylinder 72. The upper ends of levers 86, 88 are pivotally connected to the anchor end of the corresponding cylinder 72 while the lowers ends of the levers 86, 88 are pivotally connected to an upright truss 90 that is fixed to main frame section 36. Cylinders 72 can thus be adjustably moved toward and away from one another to move their respective anchor ends more inboard or outboard. A double-acting holding cylinder 92 operably interconnects the two anchor ends of cylinders 72 for effecting such adjustment and for holding cylinders 72 in a selected inboard or outboard position. Links 94 pivotally connect the anchor end of cylinder 92 with the anchor end of the right lift cylinder 72, while links 96 pivotally connect the rod end of cylinder 92 with the left lift cylinder 72.

The outer, rod ends of the rear pair of lift cylinders 72 are connected to their respective inner frame sections 38 and 40 via lost motion couplings 98. Each coupling 98 is closely similar to the couplings 78 associated with front lift cylinders 70, comprising an aligned pair of horizontal, fore-and-aft spaced slots 100 in the hinge mechanism associated with the rear pivot 48 and a fore-and-aft extending pin 102 that rides within slots 100 and is fixed to the rod end of cylinder 72. The limits of lost motion are defined by the opposite ends of slots 100.

The holding cylinder 92 must be capable of operating independently of all of the lift cylinders 54, 56, 70 and 72. One way of achieving this result is to have holding cylinder 92 on its own separate hydraulic circuit from that of the lift cylinders. Holding cylinder 92 could thus be actuated manually with its own separate control at the driver's seat of the towing vehicle. On the other hand, the desired independence could also be achieved by incorporating holding cylinder 92 within the same overall hydraulic circuit as the lift cylinders 54, 56 and 70, 72 but controlled by appropriate sequence valves or the like to assure that holding cylinder 92 is only extended or contracted at the appropriate times. In this respect, it is important that holding cylinder 92 be the first to contract during a lift sequence and the last to extend during an unfolding sequence. Holding cylinder 92 must be locked in the retracted position so that when the inner wing lift cylinders 70, 72 begin to lift on inner wing frame sections 38 and 40 during a fold up sequence, the holding cylinder 92 cannot be pulled out to its extended condition.

If sequencing valves are utilized, they can be operated hydraulically, mechanically, or electrically, as well understood by those skilled in the art. The sequence could also be controlled by a computer using position sensors and electric operated valves in accordance with known technology.

Operation

Figure 1:
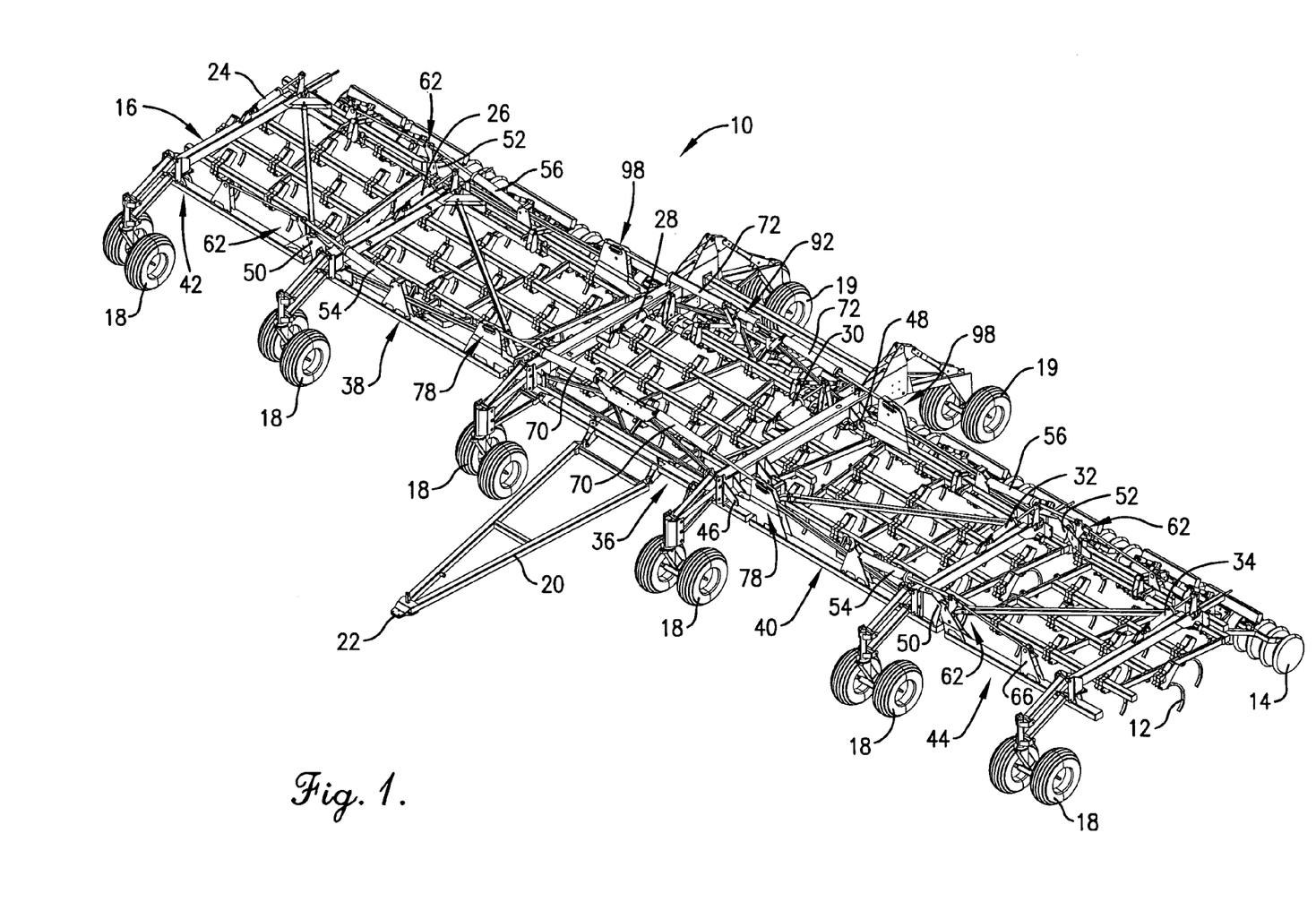
FIG. 1 is a top left front isometric view of a multiple frame section piece of farm machinery constructed in accordance with the principles of the present invention.
Figure 2:
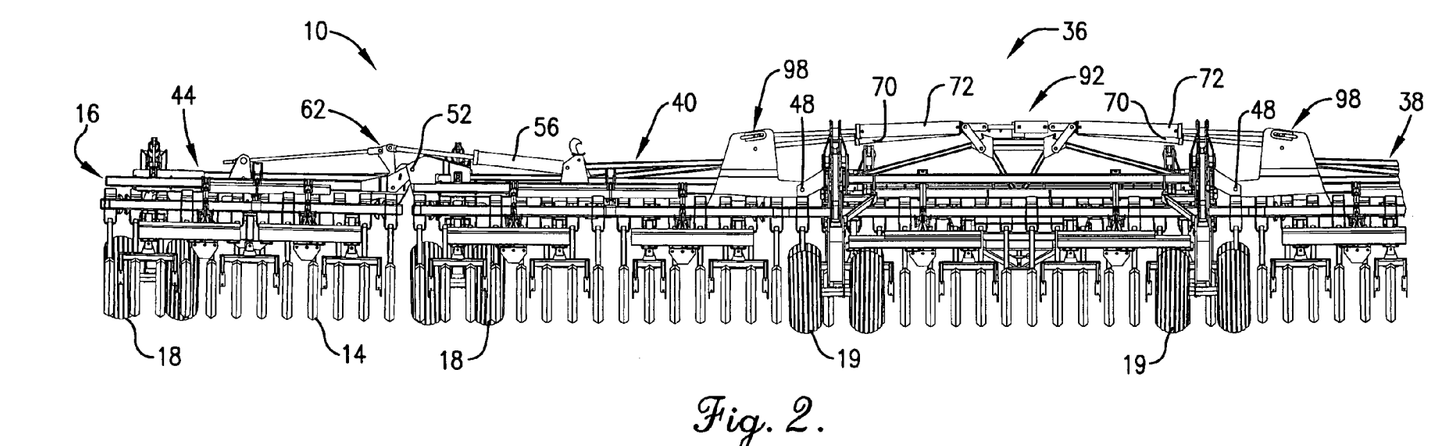
FIG. 2 is a fragmentary, rear elevational view thereof showing the holding cylinder fully extended and the inner and outer wing lift cylinders also fully extended with their lost motion couplings in intermediate positions to permit independent flexing of the inner and outer wing sections relative to the main frame section.

During field operations the transport wheel assemblies 19 are in their raised, standby positions (not shown) and operating depth is determined by front wheel assemblies 18 and packer wheels 14. The holding cylinder 92 and the lift cylinders 70, 72 and 54, 56 are all in their fully extended positions such as illustrated in FIGS. 1 and 2. The machine is set up so that with such cylinders fully extended and frame 16 in a level condition as illustrated in FIG. 2, the lost motion assemblies 62 for outer wing frame section 42, 44 and lost motion assemblies 78, 98 for inner wing frame sections 38, 40 are in their intermediate positions. For example, pins 82 and 102 of inner lost motion assemblies 78, 98 respectively are midway between opposite ends of their slots 80 and 100 respectively. This enables outer wing frame sections 42, 44 to flex up and down about their hinges 50, 52 relative to inner wing frame sections 38, 40 without contracting or extending their lift cylinders as outer wing frame sections 42, 44 encounter terrain having different contours than that encountered by inner wing frame sections 38, 40. Similarly, inner wing frame sections 38, 40 can flex up and down about pivots 46, 48 to a limited extent relative to main frame section 36 without extending or contracting their lift cylinders to accommodate terrain changes not experienced by main frame 36.

Figure 3:
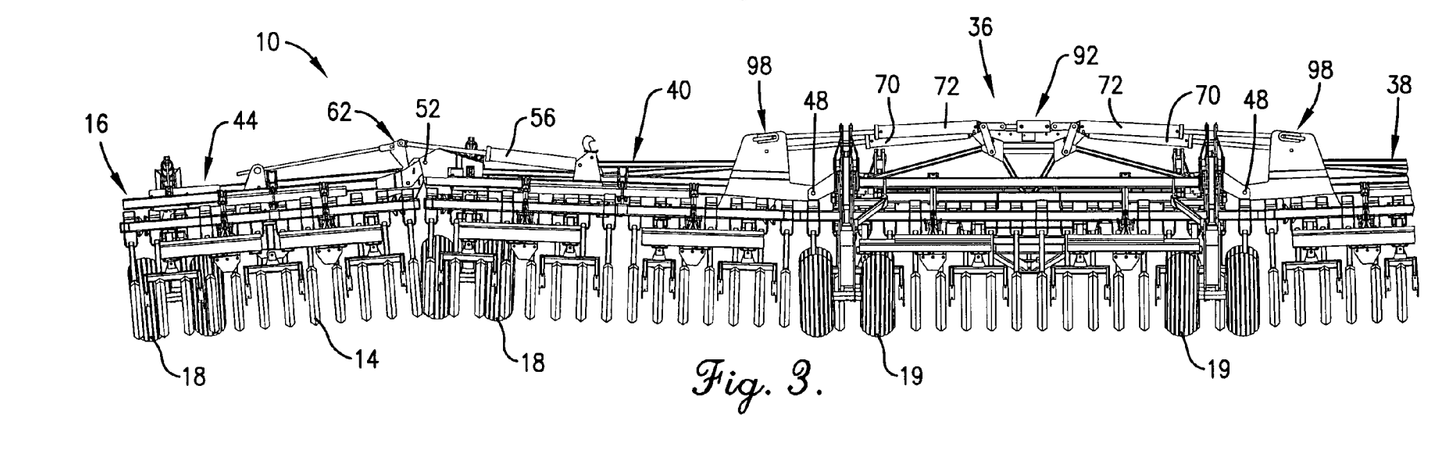
FIG. 3 is a fragmentary rear elevational view of the machine similar to FIG. 2 but showing the holding cylinder fully contracted while the inner and outer wing lift cylinders remain fully extended, thereby holding the inner wing frame sections in a slightly elevated or upwardly tilted condition.
Figure 7:
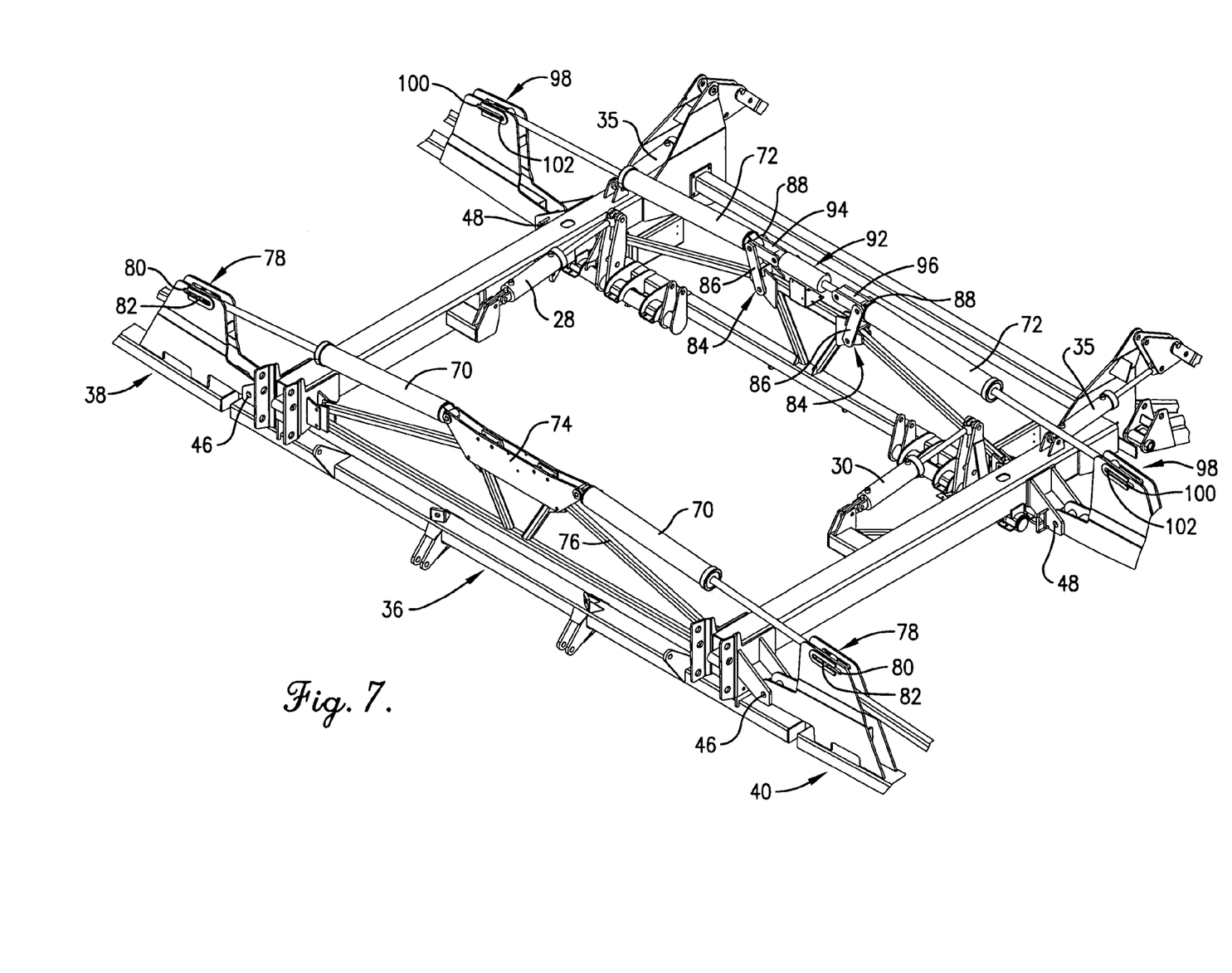
FIG. 7 is a fragmentary, top front isometric view similar to FIG. 6 but showing the holding cylinder fully retracted.

When it is time to fold the machine for transport, the front wheel assemblies 18 and packer wheels 14 are fully extended to lift the frame 16 and raise openers 12 out of the ground. Transport wheel assemblies 19 are then lowered to lift the rear of the machine. Holding cylinder 92 is then retracted, until it is totally contracted as illustrated in FIGS. 3 and 7. This causes the anchor ends of the rear pair of inner lift cylinders 72 to be pulled closer together, causing pins 102 to be moved to the inboard limits of slots 100 and lifting inner wing sections 38 and 40 slightly off the ground. Because the outer ends of inner wing frame sections 38, 40 are tilted upwardly to a certain extent at this time, the lost motion levers 60 associated with outer lost motion couplings 62 move to the outer extremes of their range of travel as outer wing frame sections 42, 44 droop downwardly as illustrated in FIG. 3.

Figure 4:
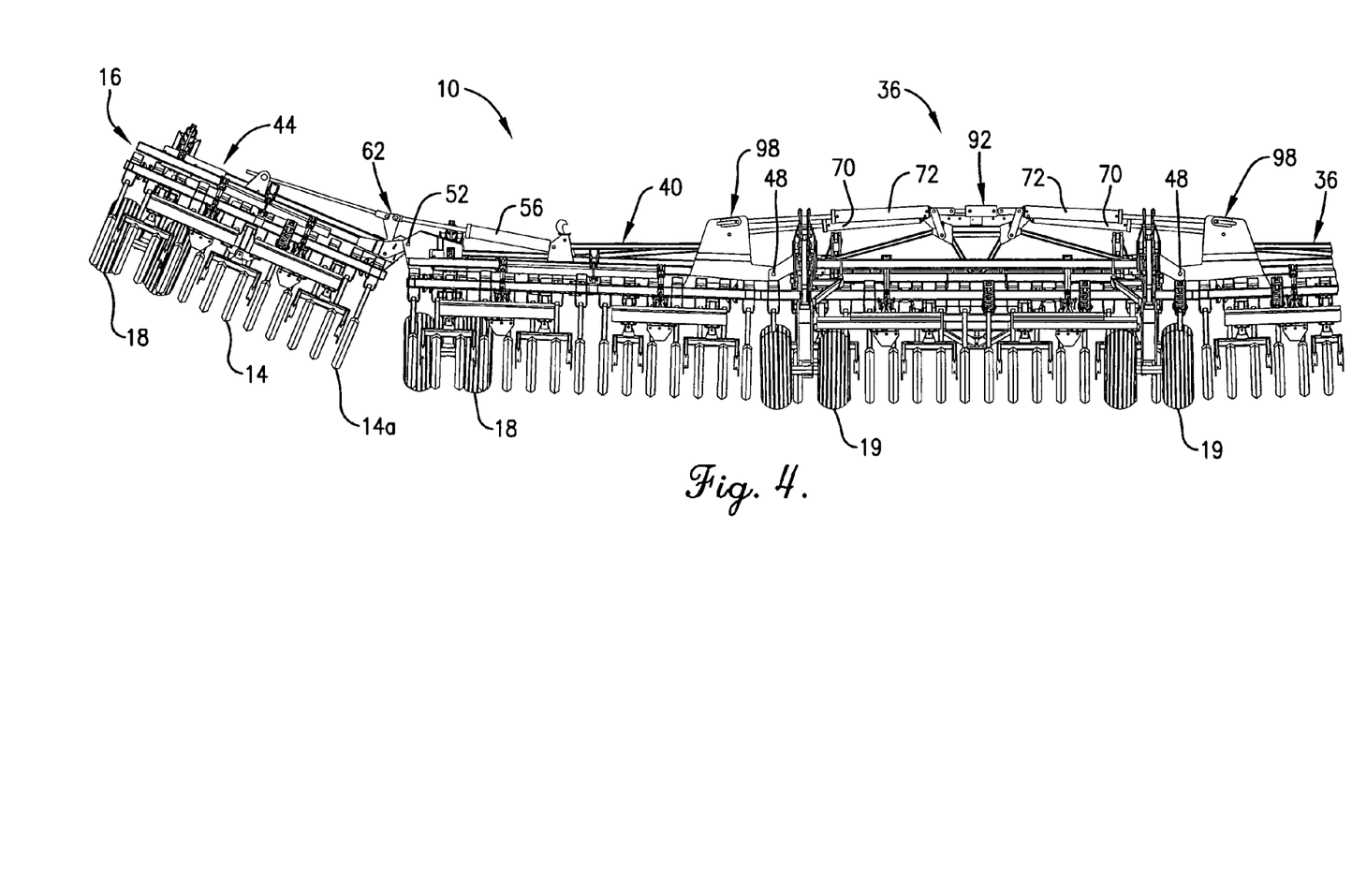
FIG. 4 is a fragmentary rear elevational view of the machine similar to FIGS. 2 and 3 with the holding cylinder fully contracted and the outer wing lift cylinder partially contracted with the tools of the outer wing frame section off the ground.

The next step in the sequence is for outer lift cylinders 54, 56 to retract, which causes the lost motion levers 60 to be pulled to their inner limits of travel and for outer wing frame sections 42, 44 to pivot upwardly about their hinge pivots 50, 52 as illustrated in FIG. 4. Such contraction of outer lift cylinders 54, 56 continues as outer wing frame sections 42, 44 swing upwardly into an essentially upright position and then pass over center through an almost 180° arc of travel to lie essentially flatly in an inverted position on top of the inner wing frame sections 38 and 40. Thereafter, inner lift cylinders 70, 72 are retracted to raise inner wing frame sections 38, 40 and the superimposed outer wing frame sections 42, 44 into an essentially upright position such that the machine becomes generally U-shaped in overall configuration as viewed from the front or the rear. Packer wheels 14 and wheel assemblies 18 on the inner and outer wing frame sections may be retracted at this time to provide a more compact unit.

During a subsequent unfolding sequence, holding cylinder 92 remains fully contracted until all of the lift cylinders have been fully extended. Thus, the first step in the unfold sequence, after extending packer wheels 14 and wheel assemblies 18 on the inner and outer wing frame sections, is for inner lift cylinders 70, 72 to gradually extend, lowering inner wing frame sections 38, 40 with outer wing frame sections 42, 44 superimposed thereon, until inner wing frame sections 38, 40 are tipped up only slightly above horizontal as illustrated in FIGS. 3 and 4. At this time, although inner lift cylinders 70, 72 will be fully extended, pins 102 of lost motion assemblies 98 will be at the inboard ends of slots 100. Next, outer lift cylinders 54, 56 are extended to unfold outer wing frame sections 42 and 44, as illustrated for example in FIG. 4. Inner wing frame sections 38, 40 remain slightly lifted up at this time so that outer wing frame sections 42, 48 completely unfold without inboard tools on the outer frame sections, such as packer wheel 14a closest to pivot 52 in FIG. 4, contacting the ground and dragging or digging into the soil during the unfolding action. With the outer ends of inner wing frame sections 38, 40 held in a slightly raised condition at this time by holding cylinder 92, the outer ends of outer wing frame sections 42, 44 can actually dip down past horizontal to a certain extent as illustrated in FIG. 3.

Finally, after all of the lifting cylinders 54, 56, 70 and 72 have been fully extended, holding cylinder 92 extends to allow inner wing frame sections 38, 40 to settle down onto the ground into a level condition as illustrated in FIG. 2. Preferably, holding cylinder 92 continues to extend sufficiently as to move the pins 102 to midway positions within the slots 100 so as to permit a free floating action on the part of the inner wing frame sections 38 and 40. Thereafter, transport wheel assemblies 19 are raised and the machine is ready to resume field operations.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In an agricultural machine having a main frame section, a pair of inner wing frame sections hingedly connected to opposite outer ends of the main frame section, and a pair of outer wing frame sections hingedly connected to outer ends of respective inner wing frame sections, the improvement comprising:

a pair of outer lift cylinders operably coupled between respective inner and outer wing frame sections for raising and lowering the outer wing frame sections relative to the inner wing frame sections;

a pair of inner lift cylinders operably coupled with respective inner wing frame sections for raising and lowering the inner wing frame sections relative to the main frame section; and a holding cylinder operably interconnecting said inner lift cylinders for selectively adjusting the position of the inner lift cylinders, said outer lift cylinders said inner lift cylinders and said holding cylinder being interconnected in a common hydraulic folding circuit whereby the outer wings are swingable between an unfolded position wherein the outer wings extend generally horizontally outwardly from the inner wings and a folded position wherein the outer wings are raised up out of the unfolded position and the inner wings are swingable between an unfolded position wherein the inner wings extend generally horizontally outwardly from the main frame and a folded position wherein the inner wings project upwardly from the main frame.

2. In an agricultural machine as claimed in claim 1, further comprising structure adjustably attaching each of the inner lift cylinders to the main frame section.

3. In an agricultural machine as claimed in claim 1, each of said inner lift cylinders having a lost motion coupling with its inner wing frame section.

4. In an agricultural machine as claimed in claim 3, each of said outer lift cylinders having a lost motion coupling with its outer wing frame section.

* * * * *